United States Patent [19]

Fasterding et al.

[11] Patent Number: 5,735,762
[45] Date of Patent: Apr. 7, 1998

[54] PULLEY, IN PARTICULAR FREE-RUNNING PULLEY

[75] Inventors: Henning Fasterding, Markgroeningen; Hermann Lehnertz, Fellbach, both of Germany; Oswald Antl, Miskin Pontyclun, Great Britain

[73] Assignee: Robert Bosch GmbH, Stuttgart, Germany

[21] Appl. No.: 612,532

[22] Filed: Mar. 8, 1996

[30] Foreign Application Priority Data

Mar. 8, 1995 [DE] Germany .................. 195 07 860.8

[51] Int. Cl.⁶ ................................................. F16H 55/36
[52] U.S. Cl. ................... 474/166; 474/903; 464/182; 403/298
[58] Field of Search ......................... 474/166, 197, 474/152, 273, 903, 168, 198; 464/182; 411/5, 389, 403, 404; 403/298, 343, 359, 256; 81/436, 460, 461

[56] References Cited

U.S. PATENT DOCUMENTS

| | | | |
|---|---|---|---|
| 1,075,710 | 10/1913 | Goodwin | 81/436 |
| 1,371,965 | 3/1921 | York | 81/436 |
| 1,779,805 | 10/1930 | Dunwoodie | 403/359 |
| 2,880,008 | 3/1959 | Stoner | 81/460 |
| 2,917,935 | 12/1959 | Haug . | |
| 2,925,293 | 2/1960 | Voss et al. | 474/903 |
| 3,135,127 | 6/1964 | Reed | 474/152 |
| 3,910,398 | 10/1975 | Kubota et al. | 197/73 |
| 4,068,907 | 1/1978 | Zenthoefer | 308/18 |
| 4,185,937 | 1/1980 | Anderson | 403/316 |
| 5,139,463 | 8/1992 | Bytek et al. . | |
| 5,163,883 | 11/1992 | Bradfield . | |
| 5,195,241 | 3/1993 | Bradfield | 29/892 |
| 5,291,811 | 3/1994 | Goss | 81/460 |

FOREIGN PATENT DOCUMENTS

| | | |
|---|---|---|
| 72 17851 | 5/1972 | France . |
| 9011870 U | 11/1990 | Germany . |
| 4206222A1 | 4/1993 | Germany . |

*Primary Examiner*—Tamara L. Graysay
*Assistant Examiner*—Gary S. Hartmann
*Attorney, Agent, or Firm*—Michael J. Striker

[57] ABSTRACT

A pulley, in particular a free-running pulley, comprises a pulley body having an throughgoing opening for mounting on a shaft end of a machine and provided with an inner thread cooperating with a counter-thread of the shaft end. The throughgoing opening has a portion which is arranged forwardly of the inner thread and being provided on its periphery with a contour repeating at regular distances from one another and adapted for a form-locking engagement of a tool for tightening or loosening the pulley body on the shaft.

5 Claims, 1 Drawing Sheet

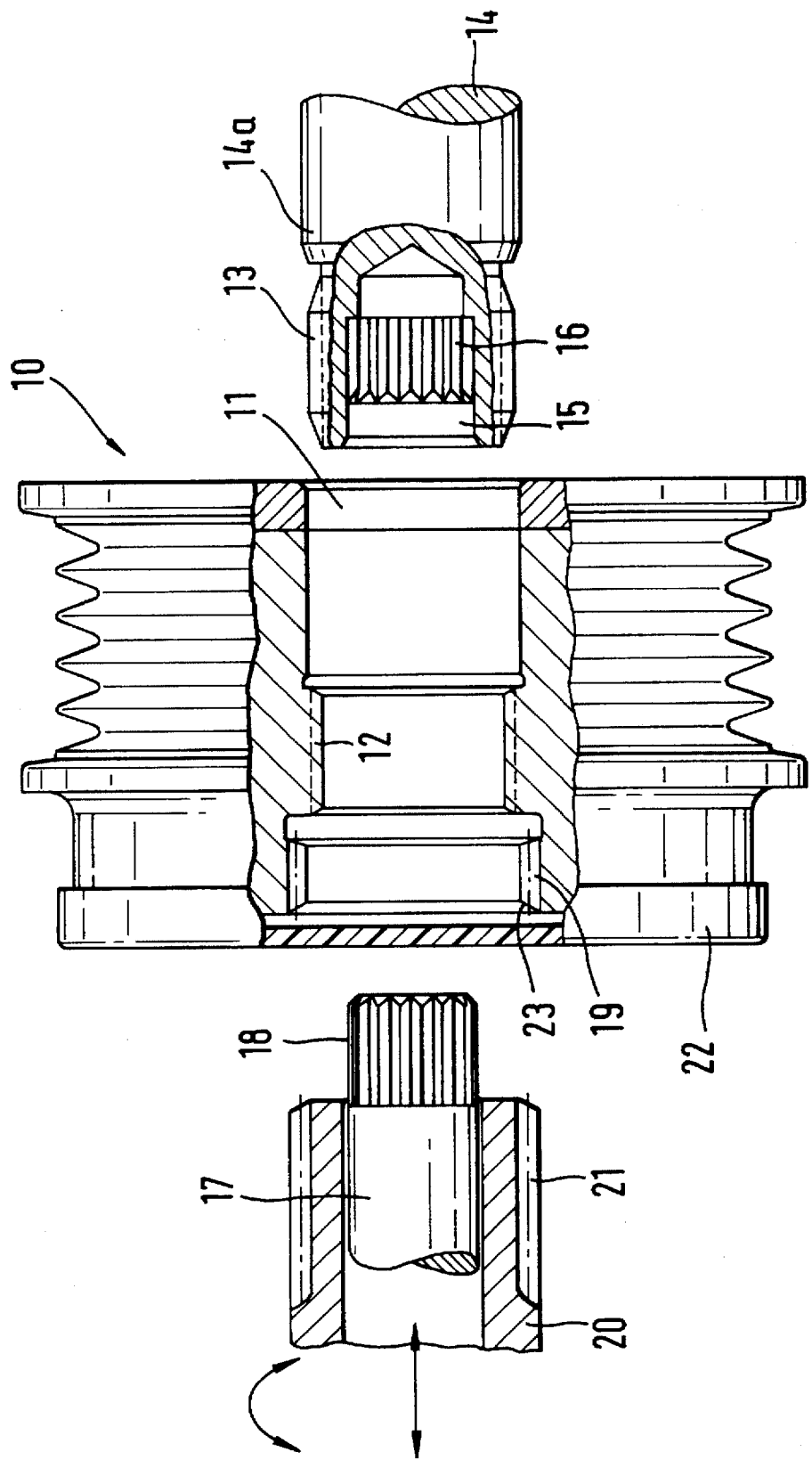

PULLEY, IN PARTICULAR FREE-RUNNING PULLEY

BACKGROUND OF THE INVENTION

The present invention relates generally to pulleys, in particular to free-running pulleys.

Free-running pulleys are known in the art. In known, commercial available free-running pulleys the free-running pulley is connected with a shaft end of a generator for a motor vehicle through a thread on the shaft so as to be fixed with the shaft. The supply of the tensioning moment into the pulley is performed by a two-pin key engaging in two openings arranged at the end side of the pulley diametrically relative to one another. During tensioning of the pulley, the shaft is fixed by a counter-holder.

In other known generators the pulleys are tightened by a separate nut as disclosed for example in the German document DE-GM 93 03 966. The counter-holder engages in a polygonal opening at the end side of the machine shaft. Since the free running pulley due to its great length, is directly placed on the thread of the machine shaft, the utilization of a two-pin key for tightening the pulley is hardly suitable for a serious mounting, since the turning of the key for finding the end-side engaging opening is time consuming.

SUMMARY OF THE INVENTION

Accordingly, it is an object of the present invention to provide a pulley, in particular a free-running pulley, which avoids the disadvantages of the prior art.

More particularly, it is an object of the present invention to provide a pulley which is formed so that it is possible to introduce the tightening moment into the pulley in a proper way in a series production.

In keeping with these objects and with others which will become apparent hereinafter, one feature of the present invention resides, briefly stated, in a pulley, in particular a free-running pulley, comprises a pulley body having an throughgoing opening for mounting on a shaft end of a machine and provided with an inner thread cooperating with a counter-thread of the shaft end, the throughgoing opening has a portion which is arranged forwardly of the inner thread and being provided on its periphery with a contour repeating at regular distances from one another and adapted for a form-locking engagement of a tool for tightening or loosening the pulley body on the shaft.

When the pulley is designed in accordance with the present invention it has the advantage that with small tool turning, an easy insertion of the tightening tool into the serrations of the pulley is guaranteed. Therefore the cycle time for tightening of the pulley on the shaft is substantially reduced for example to less than 6 seconds. A further advantage of the inventive pulley is that it is more reliable to transfer the tightening moment through the serrations, and no additional space is needed for tightening when compared with known solutions.

In accordance with another feature of the present invention, the front end portion of the throughgoing opening has inner serrations for the tool engagement.

In accordance with still a further feature of the present invention, the inner diameter of the serrations is greater than the outer diameter of the inner thread of the throughgoing opening.

Still another feature of the present invention is that the serrations have a conical insertion incline for the tool receipt.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a free-running pulley before mounting on a shaft end of a generator shaft.

DESCRIPTION OF THE PREFERRED EMBODIMENTS

A free-running pulley is identified in the drawing with reference numeral 10. It has a central opening 11 with a central portion provided with an inner thread 12. The pulley 10 is screwed with this inner thread on an outer thread 13 provided on shaft end 14a of a generator shaft 14. The shaft end 14a has at its side a blind hole 15, provided with inner teeth 16. An axially displaceable counter-holder 17 having outer teeth 18 engaging the inner teeth of the blind hole 15 during mounting of the pulley 10.

In order to tighten or loosen the pulley 10 on the generator shaft 14, a front portion of a central opening 11 is provided with inner serrations 19 located in front of the inner thread 12. An axially displaceable and turnable tool 20 provided with outer serrations 21 is insertable in the inner serrations 19 to mount the pulley with a tightening moment of 80 Nm on the shaft 14. After the mounting a protective cap 22 is attached to the end side of the pulley 10.

In order to facilitate an engagement of the tool 20 into the serrations 19 of the pulley 10, a conical inlet incline 23 for receiving the tool is provided on the outer end of the pulley 10. Moreover, for reliable introduction of the required tightening moment, the inner diameter of the serrations 19 are greater than the outer diameter of the inner thread 12 of the pulley 10.

It is to be understood that instead of serrations for engagement with the tool 20, other structures can be provided, such as for example a polygonal contour, a wedge contour and the like, a contour which is repeated on the periphery of the central opening 11 at the same distance for a form-locking engagement of the tool with the corresponding counter-contour.

It will be understood that each of the elements described above, or two or more together, may also find a useful application in other types of constructions differing from the types described above.

While the invention has been illustrated and described as embodied in a pulley, in particular free-running pulley, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A shaft-pulley assembly, comprising a pulley with a pulley body having a throughgoing opening; a shaft supporting said pulley and having a shaft end provided with a blind hole, so that said pulley body is mounted on said shaft end through said throughgoing opening, said throughgoing opening having a portion provided with an inner thread and said shaft thread has a counter thread cooperating with said inner thread, said throughgoing opening also having an end portion, said end portion of said throughgoing opening and said blind hole being each provided with contours repeating at regular distances from one another and adapted for a form-locking engagement of a tool for tightening and loosening of said pulley on said shaft.

2. A shaft-pulley assembly as defined in claim 1, wherein said end portion and said blind hole are each provided with said contours formed as a plurality of serrations.

3. A shaft-pulley assembly as defined in claim 2, wherein said serrations have an inner diameter which is greater than an outer diameter of said inner thread of said throughgoing opening.

4. A shaft-pulley assembly as defined in claim 2, wherein said serrations of said throughgoing opening and of said blind hole have a conical inlet incline for receiving of the tool.

5. A shaft-pulley assembly as defined in claim 3, wherein said serrations of said throughgoing opening and of said blind hole have a conical inlet incline for receiving of the tool.

* * * * *